Figure 1:
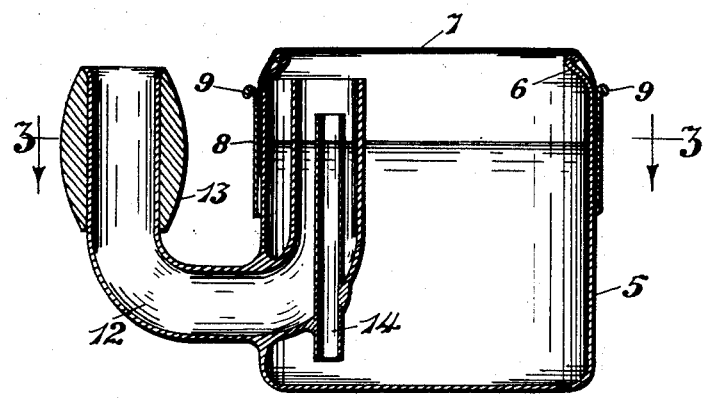

April 1, 1930.     G. W. TARKINGTON     1,752,761
METHOD AND MEANS FOR EXTRACTING ESSENTIALS
FROM COFFEE AND OTHER SUBSTANCES
Filed July 5, 1924

INVENTOR.
G. W. Tarkington
BY
ATTORNEY.

Patented Apr. 1, 1930

1,752,761

UNITED STATES PATENT OFFICE

GEORGE W. TARKINGTON, OF SILVER PLUME, COLORADO

METHOD AND MEANS FOR EXTRACTING ESSENTIALS FROM COFFEE AND OTHER SUBSTANCES

Application filed July 5, 1924. Serial No. 724,383.

My invention relates to a device for extracting the essentials from ground coffee and other substances and its principal object is to provide in a device of this character means for regulating the flow of the extract by automatic control of the pressures under which it is obtained.

With the above and other objects in view, my invention consists in providing a container having a bottom member composed of a suitable strainer or filter medium. An opening in the side of the container admits air to the space above the infusion supported on the filter bottom, and a gage in connection with the opening automatically regulates the admission of air so as to maintain in the space above referred to, a partial vacuum which retards the flow of liquid to a predetermined extent during the greater part of the operation.

The gage furthermore functions to admit air to the space above the contents of the container without its passing through the infusion, which is of advantage since aeration of many substances such as coffee, during the process of extraction, produces chemical changes detrimental to the flavor of the extract.

By the use of my invention an extract of full strength and flavor is rapidly produced without its being contaminated by undesired ingredients of the substance under treatment or by the admixture of solids capable of passing through the interstices of the filtering medium.

The device for carrying my invention into practice, an embodiment of which has been illustrated in the accompanying drawings, has many structural advantages which add to its efficiency and practicability in use and will be fully disclosed in the course of the following description.

In the drawings in the three views of which like parts are similarly designated.

Figure 1 represents a sectional elevation of the device embodying my invention, in the position it occupies in the first stage of the process prior to the delivery of the extract.

Figure 3:
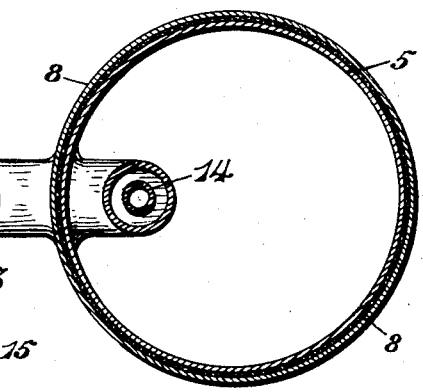
Figure 2:
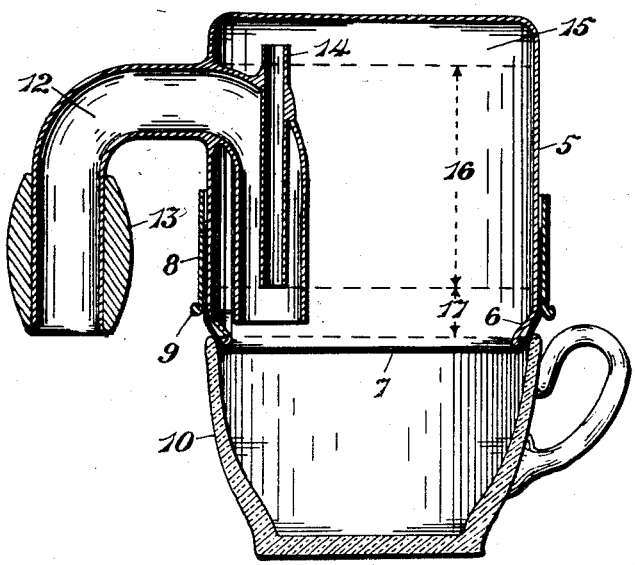

Figure 2, a similar sectional elevation of the device in an inverted position above a vessel in which the extract is received; and Figure 3, a horizontal section in a plane indicated by the line 3—3 in Figure 1.

Referring in detail to the drawings, 5 designates a preferably cylindrical container having a mouth defined by an inwardly tapering rim 6 the edge of which is ring-beaded to prevent wear or injury to the filter medium drawn across the mouth.

The filter medium 7 consists of a suitable fabric, preferably a piece of white cloth, which is drawn taut over the circumferential edge of the mouth of the container and secured in position by a sliding ring 8 which fits snugly upon the cylindrical wall of the container.

The upper edge of the ring is ring-beaded or otherwise flanged as at 9, so that by engagement with the rim of a vessel 10 upon which the device is supported in an inverted position as shown in Figure 2, it may determine the depth to which the mouth of the container projects in the vessel and thereby gauge the height to which the vessel is filled with the extract delivered through the filter cloth.

The container has in its circumferential wall an air-inlet preferably provided through the medium of a duct 12 of U-shaped form, one leg of which extends inside the container to within a short distance from its mouth, and the other leg of which projects outside the container in spaced relation to the wall thereof to provide a handle which facilitates manipulation of the device. A grip 13 of insulating material fitted around the handle protects the hand of the user from the heated aluminum or other metal of which the device is made in preference to other materials.

The gage of the device mentioned hereinbefore, consists of an open ended tube 14 coaxial with the inner member of the air duct and projecting through an aperture in the lower portion of the duct, the upper and lower ends of the tube being positioned respectively below the upper end of the duct and in spaced relation to the bottom of the container.

In the operation of my invention, the container is partially filled with water heated to the boiling point, together with a measured quantity of coffee or other substance from which an extract is desired.

The cloth filter is then secured over the mouth of the container in the manner hereinbefore described, after which the device is gradually turned to the reversed position over a cup or other receiver as illustrated in Figure 2.

In filling the container, care should be taken to not have liquid enter the air duct and to keep the level of the liquid below the upper end of the gage tube 14.

As soon as the container is placed in its reversed position, the infusion contained therein seeks a new level, leaving a space 15 in the upper portion of the device filled with air at less than atmospheric pressure.

The liquid which was contained in the gage tube passes through the now lower end thereof and is met by the liquid rising in the air duct.

The liquid rising in the air duct by the hydrostatic head indicated in Figure 2 of the drawing by the broken line 16, enlarges the space 15 in the upper portion of the container and thereby rarefies the air in said space until the liquid head and the air pressure in said space balance the outside atmospheric pressure. At the same time, however, the flow of extract through the filter medium commences and the consequent lowering level of liquid further increases the partial vacuum above the same.

The air pressure in the space 15 and the liquid head 16 together equal atmospheric pressure at all times. However, as the liquid drains from the container 5, the head 16 decreases. Therefore, more air pressure has to be admitted to the space continuously in order to compensate for the continuous loss of liquid. The ratio of the air pressure in the space 15 to the liquid head 16 is inverse or indirect, since one gains as the other loses. To thus increase the pressure in the space 15, a constant stream of tiny air bubbles rises through the tube 14 during filtration.

It will be apparent that in this manner, the head above the lower end of the gage tube is constantly balanced by the air pressure above the same so that the only pressure under which the extract is forced to pass through the filter cloth is that represented by the effective head of the matter in the container below the lower end of the gage tube as indicated at 17 in the drawing. This condition is maintained until the continuously lowered level of the liquid falls below the end of the gage tube when the vacuum is destroyed and the remainder of the liquid in the container is discharged under atmospheric pressure. The rate of filtration is controlled by raising or lowering the gage tube 14. The larger the head 17, the faster the rate, the smaller the head, the slower the rate.

The device as shown and hereinabove described, is particularly adapted for use in making small quantities of coffee expeditiously and by the simple process of placing hot water and ground coffee in the container, fastening the strainer across the mouth thereof and inverting the device over an ordinary cup or other suitable vessel.

The coffee extract passing through the interstices of the strainer is free from impurities or solids as hereinbefore explained, principally for the reason that it is obtained in a gentle non-pulsating flow produced under the restricted pressure of a predetermined low hydrostatic head.

In case the capacity of the container is greater than that of the vessel in which the extract is delivered, overflowing of the latter is prevented by discontinuance of the flow when the liquid in the vessel touches the filter cloth, it being evident that the oil on the surface of the cloth and the air caught in the meshes of the same form a tough skin-friction that causes a resistance effectively opposing the pressure of the effective head in the container.

The wide mouth of the container and the absence of valves and other movable parts permit of its being easily and thoroughly cleaned after each use.

Having thus described my invention what I claim and desire to secure by Letters Patent is—

1. The method of making extracts consisting in causing liquid in an infusion to filter under a pressure less than atmospheric, automatically maintained in inverse ratio to the diminishing quantity of unfiltered liquid in the infusion.

2. A device for making extracts comprising a container, a filter medium at the bottom thereof, and means to automatically maintain a pressure less than atmospheric at the opposite end of the container, in indirect ratio to a diminishing quantity of infusion in the container while the liquid in the infusion passes through the filter medium.

3. A device for making extracts comprising a container, a filter medium at an end thereof, a duct in the container having adjacent the filter medium an opening in connection with the atmosphere, and a gage adapted to conduct air from adjacent said opening to the space at the end of the container opposite to that closed by the filter medium.

4. A device for making extracts comprising a container, a filter medium closing an end thereof, and an open-ended air duct having one leg in the container, and its other leg outside the container.

5. A device for making extracts comprising a container, a filter medium closing an end thereof, and an open-ended air duct having one leg inside the container with the end thereof adjacent the filter medium and having its other leg outside the container in spaced relation to the wall thereof.

6. A device for making extracts comprising a container, a filter medium at an end thereof, a duct in the container having adjacent the filter medium, an opening in connection with the atmosphere, and an open-ended tube connecting the interior of the duct adjacent said opening with the space at the end of the container opposite that closed by the filter medium.

7. A device for making extracts comprising a container, a filter medium closing an end thereof, a U-shaped air duct having one leg inside the container with the end thereof adjacent the filter medium and having its other leg outside the container, and an open-ended tube extending through the inside leg of the duct to conduct air entering the duct to a space at the end of the container opposite to that closed by the filter medium.

8. A device for making extracts comprising a container, a filter medium at the bottom thereof, a duct extending downwardly in the container and having an opening adjacent the filter medium in connection with the atmosphere, and an open-ended tube in the duct to conduct air from adjacent said opening to a space at the top of the container.

9. A device for making extracts comprising an otherwise closed container having two openings, a filter medium at one opening, and an open-ended duct connecting the other opening with the atmosphere, the end of the duct within the container terminating adjacent the filter medium.

10. In a device of the character described, the combination with a receiver, of a container closed at one end and provided at the opposite end with a restraining surface apertured for the discharge of liquid from the container to the receiver, a duct in the container having adjacent the restraining surface an opening in connection with the atmosphere and a gage adapted to conduct air from adjacent said opening to the space at the closed end of the container.

11. A device for making extracts comprising a container, a filtering medium at an end thereof, an open-ended duct passing through the wall of the container, and having an opening in the container between the filter medium and the end of the container that is uppermost when the container is in an operative position.

12. The method of making extracts consisting in producing an infusion, and filtering the same at a predetermined rate and duration of flow by excluding atmospheric pressure from the surface of the infusion and introducing air under pressure at a point between the surface of the infusion and the filter medium, against the pressure above the point of introduction.

13. The method of controlling the rate and duration of flow of a filtrate from an infusion during filtration consisting in excluding atmospheric pressure from the surface of the infusion and introducing air by atmospheric pressure at a point between the surface of the infusion and the filter medium, against the pressure above the point of introduction of the air.

14. The method of controlling the rate and duration of flow of a filtrate from an infusion, consisting in maintaining a partial vacuum at its surface, and introducing air at atmospheric pressure at a point below its surface.

15. A device for making extracts comprising a container having an air-tight space at an end and having a filter opening at the opposite end, and a duct having an open end adjacent the filter opening in connection with the atmosphere.

16. A device for making extracts comprising a container having a restricted filter opening, and an open-ended air duct having one leg in the container and the other leg outside the same, the legs extending in the same general direction.

17. A device for making extracts comprising a container having a restricted filter opening, and an open-ended air duct having one leg in the container and the other leg outside the same, the legs being approximately the same length.

18. The method of making extracts consisting in filtering liquid under a head of liquid and air pressure automatically maintained equal to atmospheric pressure while filtering.

In testimony whereof I have affixed my signature.

GEORGE W. TARKINGTON.